United States Patent
Nica

(10) Patent No.: US 7,546,311 B2
(45) Date of Patent: Jun. 9, 2009

(54) OPTIMIZATION OF LEFT AND RIGHT OUTER JOIN OPERATIONS IN DATABASE MANAGEMENT SYSTEMS

(75) Inventor: Anisoara Nica, Waterloo (CA)

(73) Assignee: iAnywhere Solutions, Inc., Dublin, CA (US)

( * ) Notice: Subject to any disclaimer, the term of this patent is extended or adjusted under 35 U.S.C. 154(b) by 195 days.

(21) Appl. No.: 11/606,092

(22) Filed: Nov. 30, 2006

(65) Prior Publication Data

US 2008/0133461 A1   Jun. 5, 2008

(51) Int. Cl.
*G06F 17/30* (2006.01)

(52) U.S. Cl. .......................... 707/102; 707/10

(58) Field of Classification Search ............... 707/1–7, 707/100–102, 104.1; 379/185; 725/112
See application file for complete search history.

(56) References Cited

U.S. PATENT DOCUMENTS

| | | | | | |
|---|---|---|---|---|---|
| 5,659,728 | A | * | 8/1997 | Bhargava et al. ................ | 707/2 |
| 5,680,603 | A | * | 10/1997 | Bhargava et al. ................ | 707/2 |
| 5,687,362 | A | * | 11/1997 | Bhargava et al. ................ | 707/2 |
| 5,713,015 | A | * | 1/1998 | Goel et al. ...................... | 707/4 |
| 5,855,019 | A | * | 12/1998 | Bhargava et al. ................ | 707/9 |
| 6,088,691 | A | * | 7/2000 | Bhargava et al. ................ | 707/2 |
| 6,665,663 | B2 | * | 12/2003 | Lindsay et al. .................. | 707/4 |
| 6,721,730 | B2 | | 4/2004 | Kiernan et al. | |
| 7,184,998 | B2 | * | 2/2007 | Nica ............................. | 707/2 |
| 2004/0006561 | A1 | * | 1/2004 | Nica ............................. | 707/3 |
| 2008/0097961 | A1 | * | 4/2008 | Dias et al. ...................... | 707/2 |

OTHER PUBLICATIONS

Ghazal et al., "Outer Join Elimination in Teradata RDBMS", Lecture Notes in Computer Science, pp. 730-740, 2004.

* cited by examiner

*Primary Examiner*—Diane Mizrahi
(74) *Attorney, Agent, or Firm*—Sterne, Kessler, Goldstein & Fox P.L.L.C.

(57) ABSTRACT

Techniques for left outer join (LOJ) and right outer join (ROJ) optimization are described herein. Each LOJ/ROJ is an expression that references a preserved side and a null supplying side. If Condition 1 is true, and either Condition 2 or Condition 3 is true, then the LOJ/ROJ is evaluated by evaluating the expression referencing only the preserved side, and not the null supplying side. Conditions 1, 2 and 3 are defined as follows: Condition 1: An expression from the null supplying side is not used outside of the LOJ/ROJ. Condition 2: The LOJ/ROJ is required to return only distinct values from the preserved side. Condition 3: The null supplying side returns at most one row for each row returned by the preserved side.

16 Claims, 9 Drawing Sheets

```
1    Procedure: OUTER_JOIN_OPTIMIZATION
2    Purpose: Outer Joins are analyzed and marked when they are
3    semantically equivalent to their preserved sides
4    Input:
5    – A query tree P
6    – A query subtree S of the query tree P
7    Output:
8    – The query subtree S which has LOJ/ROJ marked.
9    Notations:
10   –Tables(M) is the set of based or derived tables in a query subtree M
11   begin
12     for each node n ∈ S do
13       for each child subtree c of node n do
14         c ←— Outer_Join_Optimization(P, c)
15       od
16       if n is a Left Outer Join node then
17         NSS ←— right subtree of node n
18         PS ←— left subtree of node n
19       else
20         if n is a Right Outer Join node then
21           NSS ←— left subtree of node n
22           PS ←— right subtree of node n
23         fi
24       fi
25       if
26         – Check Condition 1
27         any expression from Tables(NSS) is not used above the node n
28       then
29         if
30           – Check Condition 2
31           OnlyDistinctValues(n, P) is TRUE
32           – Check Condition 3
33           or AtMostOneRow(n, NSS) is TRUE
34         then
35           – Mark the node n as being semantically equivalent to its child PS
36           n−> PS_{equivalent} ←— TRUE
37         fi
38       fi
39     od
40     – Return the marked query tree S
41     return S
42   end
43
```

FIG. 5

```
44   Procedure: ATMOSTONEROW
45   Purpose: Decide if a subtree of a query tree returns at most one row
46   Input:
47   – A node n in a query tree
48   – A direct child S of the node n
49   Output:
50   – TRUE or FALSE
51   Notations:
52   –Tables(M) is the set of based or derived tables in a query subtree M
53   begin
54     C ← SingleValueColumns(n, S)
55     for each table T ∈ Tables(S) do
56       if T doesn't have candidate key columns in C then return FALSE
57       fi
58     od
59     return TRUE
60   end
61
```

FIG. 6

```
62    Procedure: SINGLEVALUECOLUMNS
63    Purpose: Find all the columns that are covered with single values in the subtree S
64       using the equality predicates of the subtree S and functional dependencies
65    Input:
66      - A node n
67      - A direct child S of the node n
68    Output:
69      - A set of columns C
70    Notations:
71      -Tables(M) is the set of based or derived tables in a query subtree M
72    begin
73       C ⟵ ∅
74       for each equality predicate p used in S or n do
75          if p is of the form T.a = constant expression in S
76             where T is a table in Tables(S) and T.a is a column of T
77          then
78             C ⟵ C ∪ {T.a}
79             for each functional dependency X ⟶ Y involving the table T do
80                if X is a subset of C and Y is not a subset of C then
81                   C ⟵ C ∪ Y
82                fi
83             od
84          fi
85       od
86       for each derived table T in Tables(S) do
87          if derived table T returns always at most one row then
88             C ⟵ C ∪ {T.a|T.a is a column of the table T}
89          fi
90       od
91       change ⟵ TRUE
92       while (change) do
93          change ⟵ FALSE
94          for each equality predicate p used in S or n do
95             c_add ⟵ NULL
96             if p is of the form T.a = R.b where T and R are tables in Tables(S) then
97                if T.a is in C then c_add ⟵ R.a
98                fi
99                if R.a is in C then c_add ⟵ T.a
100               fi
101               if c_add is not in C then
102                  C ⟵ C ∪ {c_add}
103                  change ⟵ TRUE
104               fi
105               if change then
106                  for each functional dependency X ⟶ Y involving the tables T or R do
107                     if X is a subset of C and Y is not a subset of C then
108                        C ⟵ C ∪ Y
109                     fi
110                  od
111               fi
112            fi
113         od
114      od
115      return C
116   end
117
```

FIG. 7

OPTIMIZATION OF LEFT AND RIGHT OUTER JOIN OPERATIONS IN DATABASE MANAGEMENT SYSTEMS

BACKGROUND OF THE INVENTION

1. Field of the Invention

The present invention is generally directed to optimizers in database management systems, and more particularly directed to left and right outer join optimization.

2. Background Art

A query optimizer is a component of a database management system that attempts to determine the most efficient way to execute a query. If properly designed and implemented, query optimizers can significantly increase the efficiency of DBMS query processing.

Left and right outer joins are well known SQL constructs. Left and right outer joins are often useful, but are computationally expensive to process. Accordingly, there is a need for improved techniques in query optimizers for optimizing and processing left and right outer joins.

BRIEF SUMMARY OF THE INVENTION

The present invention is directed to systems, methods and computer program products for left and right outer join optimization in a database management system (DBMS).

The invention operates with both left outer joins (LOJ) and right outer joins (ROJ). Each LOJ/ROJ is an expression that references a preserved side and a null supplying side. The invention optimizes the LOJ/ROJ depending on satisfaction of a number of conditions. Specifically, if Condition 1 is true, and either Condition 2 or Condition 3 is true, then the invention concludes that the LOJ/ROJ is semantically equivalent to the expression referencing only the preserved side, and not the null supplying side. In this case the result set of the LOJ/ROJ is computed by computing only the result set of the preserved side expression. If the invention finds that Conditions 1 and 2 are true (in which case the LOJ/ROJ optimization is possible), then Condition 3 is not considered. If Condition 1 is true and Condition 2 is false, and Condition 3 is found to be true, again the LOJ/ROJ optimization is possible. If Condition 1 is found to be not true (in which case the LOJ/ROJ optimization is not possible), then Conditions 2 and 3 are not considered.

Conditions 1, 2 and 3 are defined as follows:

Condition 1: An expression from the null supplying side is not used outside of the LOJ/ROJ.

Condition 2: The LOJ/ROJ is required to return only distinct values from the preserved side.

Condition 3: The null supplying side returns at most one row for each row returned by the preserved side.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

FIGS. 5-7 illustrate pseudocode for the left outer join/right outer join optimization process, according to an embodiment of the invention.

Figure 1:
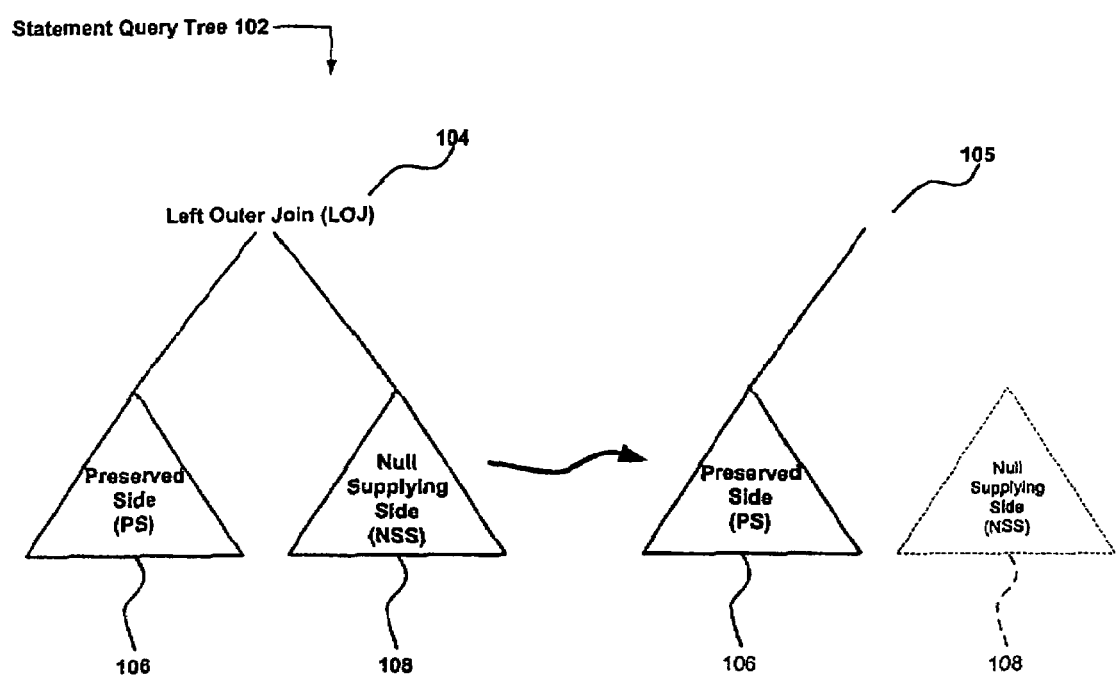
FIG. 1 illustrates a query tree of a left outer join expression.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF THE INVENTION

1. Overview of the Invention

The present invention is directed to systems, methods and computer program products for left and right outer join optimization in a database management system (DBMS).

A join combines records from two or more tables in a relational database. The Structured Query Language (SQL) includes right outer joins (ROJ) and left outer joins (LOJ) (as well as many other well known types of joins). SQL is well known and is described in many publicly available documents, including "Information Technology—Database languages—SQL," published by the American National Standards Institute as American National Standard ANSI/ISO/IEC 9075: 1992, which is hereby incorporated by reference in its entirety.

A left outer join retrieves records from a left table and records from a right table that satisfy the join's condition (or predicate). Records retrieved from the left table are concatenated with corresponding records retrieved from the right table to form the result set of the outer join. A left outer join retrieves all matching records from the left table, even if there are no corresponding matching records in the right table. In such cases, the records retrieved from the left table are concatenated with null value fields.

FIG. 1 conceptually illustrates the operation of a left outer join. The left table is called the preserved side, or PS 106. The right table is called the null supplying side, or NSS 108.

Right outer joins operate in the same way as left outer joins, except the right table is the preserved side, and the left table is the null supplying side. Accordingly, a right outer join retrieves all matching records from the right table, even if there are no corresponding matching records in the left table, and in such cases, the records retrieved from the right table are concatenated with null value fields.

The invention optimizes the processing of computing the result set of the left and right outer joins in a DBMS by processing only the preserved side. In other words, the invention decides if a table expression of the form "preserved-side LOJ/ROJ null-supplying-side ON (predicate)" is semantically equivalent to "preserved-side." It is possible for the invention to perform such optimization when certain conditions are satisfied, as shall be described in detail below.

The DBMS performance impact achieved by the invention will be apparent by the following example.

Assume you have a table SYS.SYSTABLE with the following definition:

```
create view SYS.SYSTABLE as
   select
      b.table_id,
      b.file_id,
      b.count,
      b.first_page,
      b.last_page,
      COALESCE( i.root, 0 ) as primary_root,
      iDT.index_count
      b.creator,
      b.first_ext_page,
      b.last_ext_page,
      b.table_page_count,
      b.ext_page_count,
      b.object_id,
      b.table_name,
      b.table_type,
      v.view_def,
      r.remarks,
      b.replicate,
      p.existing_obj,
      p.remote_location,
      'T' as remote_objtype,
      p.srvid,
      b.server_type,
      10 as primary_hash_limit,
      b.page_map_start,
      s.source,
   from SYS.ISYSTAB b
      left outer join SYS.ISYSREMARK r on (b.object_id = r.object_id)
      left outer join SYS.ISYSSOURCE s on (b.object_id = s.object_id)
      left outer join SYS.ISYSVIEW v on (b.object_id =
         v.view_object_id)
      left outer join SYS.ISYSPROXYTAB p on (b.object_id =
         p.table_object_id )
      left outer join (SYS.ISYSIDX i JOIN (select count(*), index_id,
         table_id from SYS.ISYSIDX i2 group by index_id, table_id )
         iDT(index_cound, index_id, table_id) on( iDT.table_id =
         i.table_id and iDT.index_id = i.index_id) )
      on ( b.table_id = i.table_id and i.index_category = 'P' and
         i.index_id = 0 )
```

Also assume you have the following query Q1:

select table_id from SYS.SYSTABLE

The result set of Q1 without LOJ/ROJ optimization is evaluated by computing the result set of the following expression containing five outer joins:

```
select table_id
   from SYS.ISYSTAB b
      left outer join SYS.ISYSREMARK r on (b.object_id = r.object_id)
      left outer join SYS.ISYSSOURCE s on (b.object_id = s.object_id)
      left outer join SYS.ISYSVIEW v on (b.object_id =
         v.view_object_id)
      left outer join SYS.ISYSPROXYTAB p on (b.object_id =
         p.table_object_id )
      left outer join (SYS.ISYSIDX i JOIN (select count(*), index_id,
         table_id from SYS.ISYSIDX i2 group by index_id, table_id)
```

-continued

```
         iDT(index_cound, index_id, table_id) on( iDT.table_id =
         i.table_id and iDT.index_id = i.index_id) )
      on ( b.table_id = i.table_id and i.index_category = 'P' and
         i.index_id = 0 )
```

In contrast, the result set of Q1 with the LOJ/ROJ optimization pursuant to the present invention is computed by evaluating the simpler expression with no outer join:

select table_id from SYS.ISYSTAB

Consider another example, the query Q2:

select table_id, view_def from SYS.SYSTABLE

The result set of the query Q2 without the optimization is computed by evaluating the following expression containing five outer joins:

```
select table_id, view_def
   from SYS.ISYSTAB b
      left outer join SYS.ISYSREMARK r on (b.object_id = r.object_id)
      left outer join SYS.ISYSSOURCE s on (b.object_id = s.object_id)
      left outer join SYS.ISYSVIEW v on (b.object_id =
         v.view_object_id)
      left outer join SYS.ISYSPROXYTAB p on (b.object_id =
         p.table_object_id )
      left outer join (SYS.ISYSIDX i JOIN (select count(*), index_id,
         table_id from SYS.ISYSIDX i2 group by index_id, table_id )
         iDT(index_cound, index_id, table_id) on( iDT.table_id =
         i.table_id and iDT.index_id = i.index_id) )
      on ( b.table_id = i.table_id and i.index_category = 'P' and
         i.index_id =0)
```

In contrast, the result set of the query Q2 with the LOJ/ROJ optimization of the present invention is computed as follows:

```
select table_id, view_def
   from SYS.ISYSTAB b
      left outer join SYS.ISYSVIEW v
         on (b.object_id = v.view_object_id)
```

2. DBMS Overview and Example Computer Implementation

Figure 2:
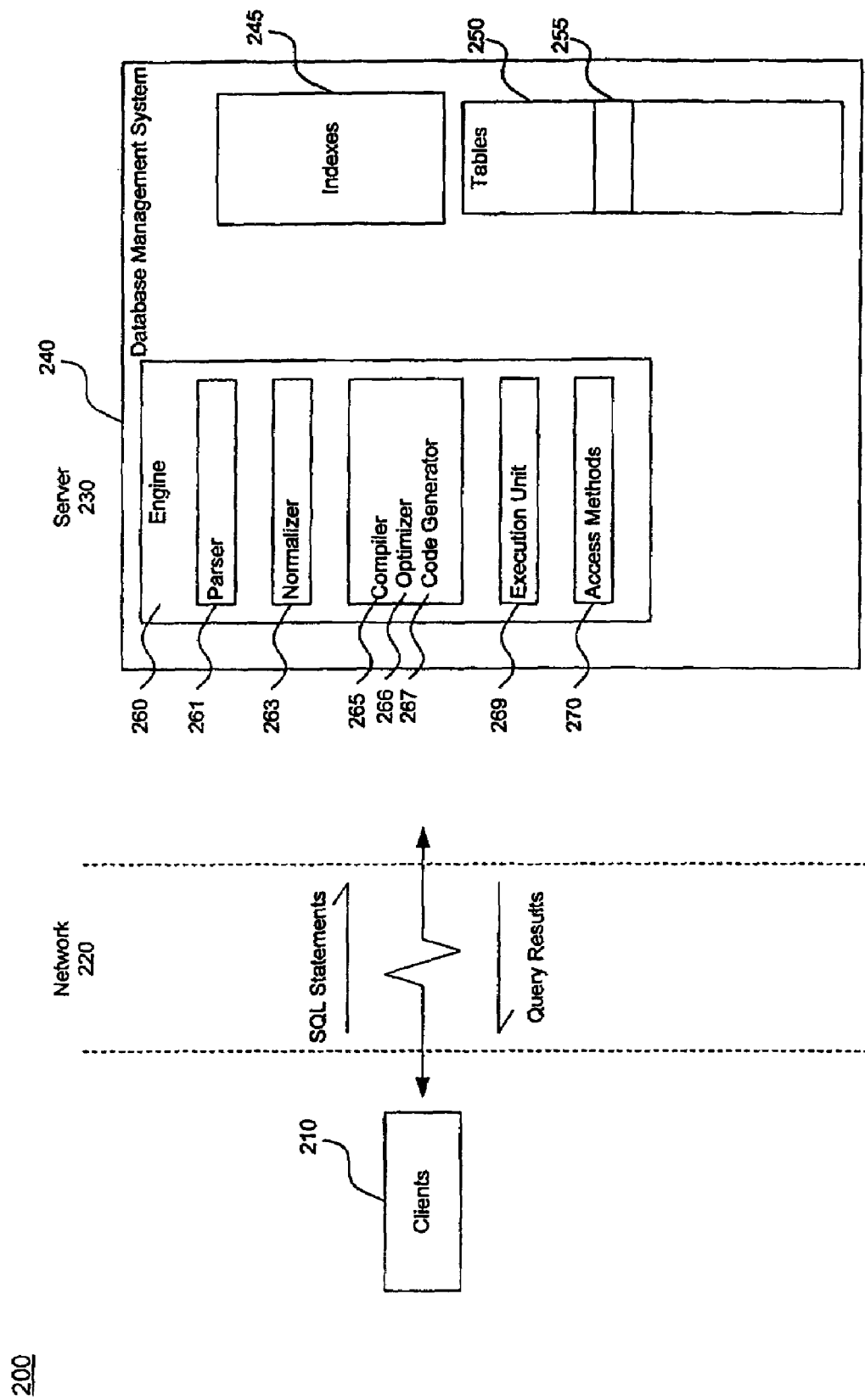
FIG. 2 illustrates a DMBS environment according to an embodiment of the invention.

FIG. 2 illustrates a client/server database system 200 according to an embodiment of the present invention. As shown, the system 200 comprises one or more clients 210 in communication with a server 230 via a network 220. A database management system (DBMS) 240 resides in the server 230.

In operation, clients 210 send data in, or retrieve data from, database tables 250 by issuing SQL statements to DBMS 240. The SQL statements received from clients 210 are processed by engine 260 of the DBMS 240. The engine 260 comprises parser 261, normalizer 263, compiler 265, execution unit 269 and access methods 270.

SQL statements received from clients 210 are passed to the parser 261 which converts the statements into a query tree, which is a binary tree data structure that represents the components of the query in a format selected for the convenience of the system. In this regard, the parser 261 employs well known parsing methodology (e.g., recursive descent parsing).

The query tree is normalized by the normalizer 263. Normalization includes, for example, the elimination of redundant operations. Additionally, the normalizer 263 performs error checking, such as confirming that table names and column names which appear in the query are valid (e.g., are available and belong together). Finally, the normalizer may also look up any referential integrity constraints which exist and add those to the query.

After normalization, the query tree is passed to the compiler 265, which includes an optimizer 266 and a code generator 267. The optimizer 266 is responsible for optimizing the query. The optimizer 266 performs a cost-based analysis for formulating a query execution plan. The optimizer 266 will, for instance, select the join order of tables, and select relevant indexes 245. The optimizer 266, therefore, performs an analysis of the query and determines the best execution plan, which in turn results in particular access methods 270 being invoked during query execution by the execution unit 269.

According to the invention, operation of the optimizer 266 includes a query preoptimization phase (that occurs during "compile time"). During this phase, the optimizer 266 optimizes query processing by performing syntactic and semantic analyses of the query tree. According to an embodiment of the invention, such syntactic and semantic optimizations include the left and right outer join optimization process that was introduced in Section 1. This process is described in greater detail in Section 3, below. (The following description of the invention as occurring during compile time is provided for illustrative purposes only, and is not limiting. Other embodiments of the invention, operating during different phases, will be apparent to persons skilled in the relevant art(s) based on the teachings contained herein. For example, an exemplary alternative embodiment wherein certain operations of the invention occur during compile time, and others occur during "execution time" by the execution unit 269, is described in Section 4 below.)

Figure 8:
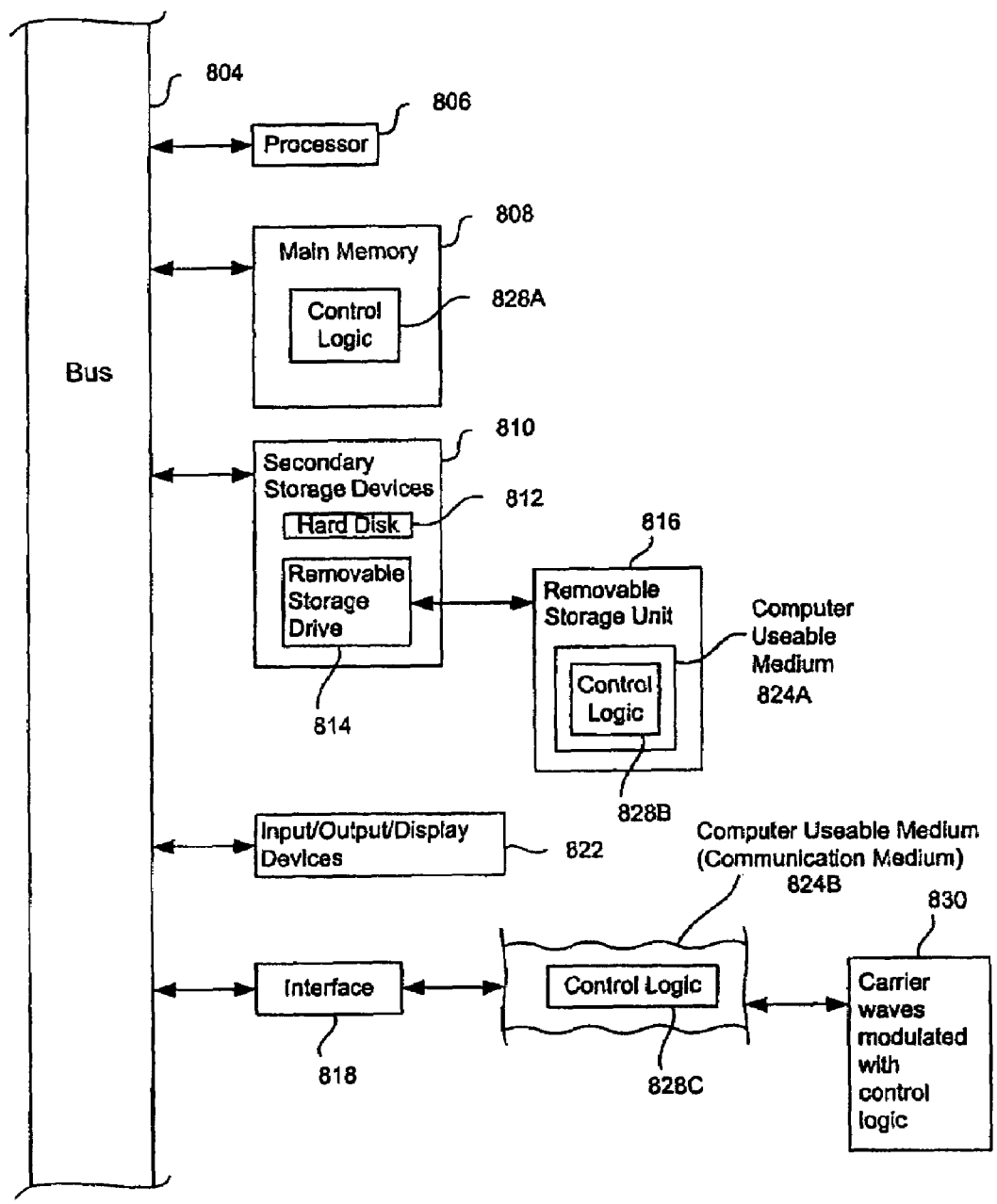
FIG. 8 illustrates an example computer system useful for implementing components of the invention.

In an embodiment of the present invention, the system and components of the present invention described herein are implemented using well known computers, such as computer 802 shown in FIG. 8. For example, clients 210 and server 230 can be implemented using computers 802.

The computer 802 can be any commercially available and well known computer capable of performing the functions described herein, such as computers available from International Business Machines, Apple, Sun, HP, Dell, Compaq, Digital, Cray, etc.

The computer 802 includes one or more processors (also called central processing units, or CPUs), such as a processor 806. The processor 806 is connected to a communication bus 804.

The computer 802 also includes a main or primary memory 808, such as random access memory (RAM). The primary memory 808 has stored therein control logic 828A (computer software), and data.

The computer 802 also includes one or more secondary storage devices 810. The secondary storage devices 810 include, for example, a hard disk drive 812 and/or a removable storage device or drive 814, as well as other types of storage devices, such as memory cards and memory sticks. The removable storage drive 814 represents a floppy disk drive, a magnetic tape drive, a compact disk drive, an optical storage device, tape backup, etc.

The removable storage drive 814 interacts with a removable storage unit 816. The removable storage unit 816 includes a computer useable or readable storage medium 824 having stored therein computer software 828B (control logic) and/or data. Removable storage unit 816 represents a floppy disk, magnetic tape, compact disk, DVD, optical storage disk, or any other computer data storage device. The removable storage drive 814 reads from and/or writes to the removable storage unit 816 in a well known manner.

The computer 802 also includes input/output/display devices 822, such as monitors, keyboards, pointing devices, etc.

The computer 802 further includes a communication or network interface 818. The network interface 818 enables the computer 802 to communicate with remote devices. For example, the network interface 818 allows the computer 802 to communicate over communication networks or mediums 824B (representing a form of a computer useable or readable medium), such as LANs, WANs, the Internet, etc. The network interface 818 may interface with remote sites or networks via wired or wireless connections.

Control logic 828C may be transmitted to and from the computer 802 via the communication medium 824B. More particularly, the computer 802 may receive and transmit carrier waves (electromagnetic signals) modulated with control logic 830 via the communication medium 824B.

Any apparatus or manufacture comprising a computer useable or readable medium having control logic (software) stored therein is referred to herein as a computer program product or program storage device. This includes, but is not limited to, the computer 802, the main memory 808, the secondary storage devices 810, the removable storage unit 816 and the carrier waves modulated with control logic 830. Such computer program products, having control logic stored therein that, when executed by one or more data processing devices, cause such data processing devices to operate as described herein represent embodiments of the invention.

The invention can work with software, hardware, and/or operating system implementations other than those described herein. Any software, hardware, and operating system implementations suitable for performing the functions described herein can be used.

3. Left Outer Join/Right Outer Join Optimization Process

Figure 3:
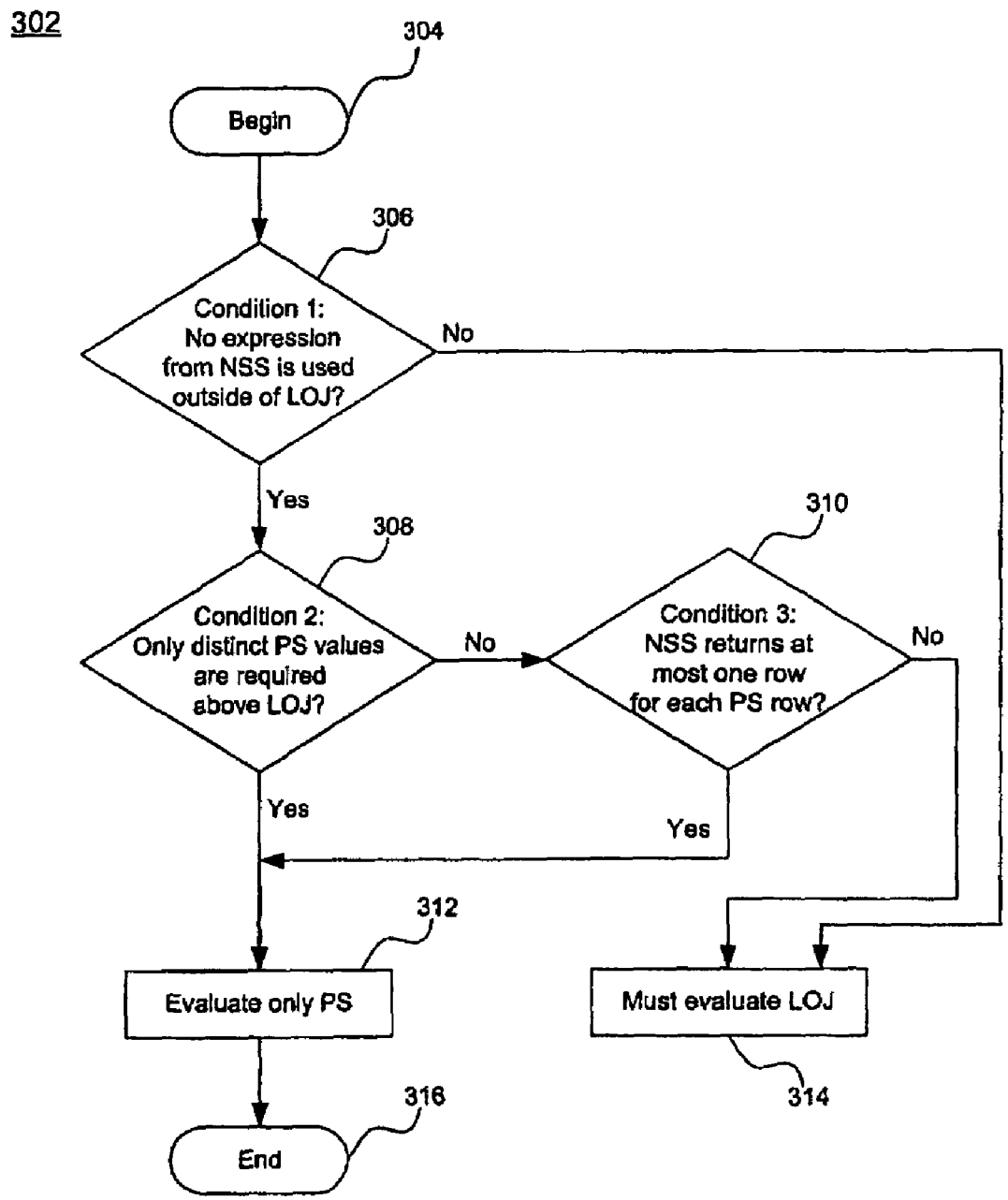
FIG. 3 illustrates a left outer join optimization process according to an embodiment of the invention. The process of FIG. 3 is also application to optimization of right outer joins.

FIG. 3 illustrates a flowchart 302 for optimization of left outer joins, according to an embodiment of the invention. Flowchart 302 is also applicable to similar optimization of right outer joins, as will be apparent to persons skilled in the relevant art(s) based on the teachings contained herein. According to an embodiment of the invention, the steps of flowchart 302 are performed by the optimizer 266 in the DBMS 240.

Generally speaking, flowchart 302 sets forth three conditions: Condition 1, 2 and 3. If Condition 1 is satisfied, and either Condition 2 or Condition 3 is satisfied, then it is possible to evaluate the left outer join expression "preserved-side LOJ null-supplying-side ON (predicate)" by computing only the expression "preserved-side." Flowchart 302 shall now be described in detail.

In step 306, optimizer 266 determines whether Condition 1 is satisfied. Specifically, the optimizer 266 determines whether it is true that no expression from the null supplying side (NSS) 108 (see FIG. 1) is used (or projected) outside the left outer join statement. If this is not true (i.e., if in fact an expression from the NSS 108 is used outside the left outer join), then it is not possible to reduce the evaluation of the left outer join to the evaluation of its preserved side without affecting the correctness of the result set outside of the LOJ. This is indicated by step 314.

The following is an example where an expression from the NSS 108 is used outside the left outer join. In this example, N.x is an expression from the NSS 108, and it is used outside the left outer join statement, namely in the WHERE clause. Accordingly, in this example, step 306 would return "False" or "no," and step 314 would be performed.

```
select P.y
    from P LOJ N ON (predicate)
    where (N.x is not null or P.z > 10)
```

If it is determined in step 306 that no expression from the NSS 108 is used outside the left outer join, then processing continues with step 308.

In step 308, optimizer 266 determines whether Condition 2 is satisfied. Specifically, the optimizer 266 determines whether the left outer join is required to return only distinct values from the preserved side PS 106. According to an embodiment of the invention, the optimizer 266 performs step 308 by determining, for example, whether the SQL query block containing the LOJ explicitly includes "select distinct" clause, such as in the following example:

select distinct P.y from P LOJ N ON (predicate)

where P.z>10

Another analysis done by the optimizer 266 in the step 308 is done to determine if the SQL query block containing the LOJ is semantically equivalent to a query block having the "select distinct" clause. An example of such query block is the query block in the "exists" construct below:

```
select T.x
    from T
    where exists(select P.y
        from P LOJ N ON (predicate)
        where P.z > 10 )
```

If, in step 308, the optimizer 266 determines that Condition 2 is satisfied, then it is decided that the LOJ result set can be evaluated by computing only the preserved side of the LOJ. This is indicated by step 312. If, instead, the optimizer 266 determines that Condition 2 is not satisfied, then step 310 is performed.

In step 310, the optimizer 266 determines whether Condition 3 is satisfied. Specifically, the optimizer 266 determines, for the particular left outer join expression in question, whether the NSS 108 returns at most one row for each row returned by the PS 106.

Figure 4:
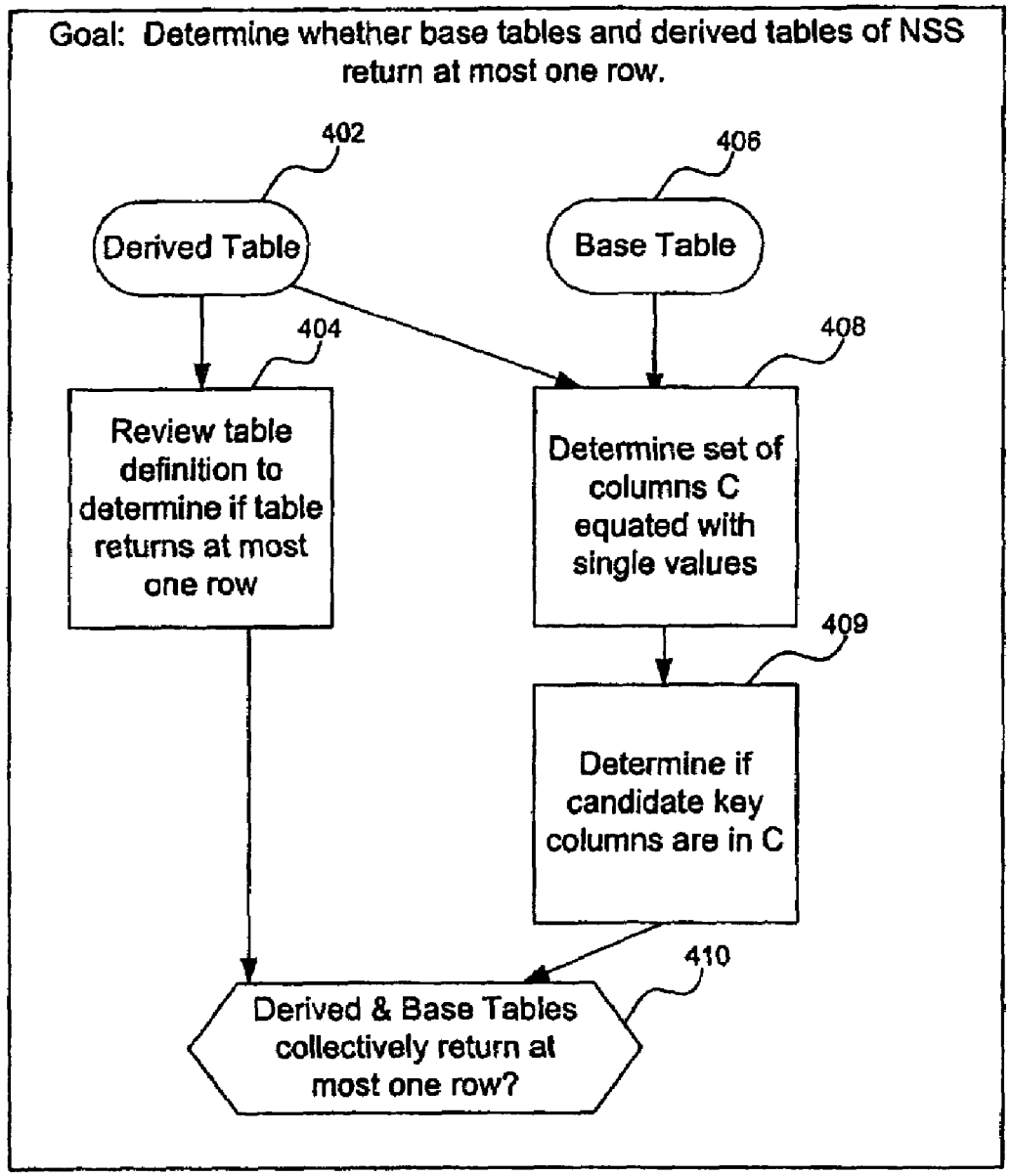
FIG. 4 illustrates a process for determining whether the null supplying side in a LOJ or ROJ returns at most one row for each row returned by the preserved side, according to an embodiment of the invention.

An example of the operation of step 310 is shown in greater detail in FIG. 4, according to an embodiment of the invention. The following description refers to "derived tables." Herein, this term refers to both the proper derived table construct as defined by the SQL standard, and also the well known concept of "view". The goal of step 310 is to determine whether the base tables and derived tables of the NSS 108 collectively return at most one row for each row returned by the PS 106. Accordingly, processing of step 310 involves reviewing each derived table 402 and each base table 406 of the NSS 108. For each derived table 402, the optimizer 266 first reviews the associated table definition (step 404). As will be appreciated by persons skilled in the relevant art(s), such table definition may sometimes indicate whether the associated derived table 402 will return at most one row. Such examples are the following derived tables whose definitions are:

select count(*) from S where (predicate)

select FIRST S.x from S where (predicate)

If the table definition does not indicate that the derived table result set will always return at most one row, the optimizer 266 continues to analyze the derived table 402 by performing step 408.

In step 408, the optimizer 266 analyzes each base and derived table in order to determine a set of its columns which are equated with single values. Examples of such columns are the following:

select S.x from S where S.y=10

In the above expression the base table S has the column S.y equated to a single value, namely the constant 10.

select S.x from S, (select sum(P.y) from P) as DT(s) where S.y=DT.s

In the above example, the derived table DT always returns one row given its definition. Hence, the base table S has the column S.y equated to a single value DT.s corresponding to the value of the single row returned by the table DT.

select DT.* from (select P.x, P.y from P where (predicate)) as DT(a,b) where DT.a=10

In the example above, the derived table DT has one of its columns DT.a equated to a single value, namely the constant 10.

In step 409, the optimizer 266 reviews each candidate key columns to determine whether they are among the columns equated with single values, found at step 408, which would indicate that the derived table 402 or the base table 406 returns at most one row.

After steps 404, 408 and 409 are performed, the optimizer 266 is able to determine whether the base tables/derived tables of the NSS 108 collectively return at most one row for each row returned by the PS 106 (step 410).

It is noted that the example approach for performing step 310 illustrated in FIG. 4 is provided for purposes of illustration, and not limitation. Other approaches for performing step 310 will be apparent to persons skilled in the relevant art(s).

Referring back to FIG. 3, if it is determined in step 310 that Condition 3 is satisfied, then it is concluded that the LOJ can be optimized by evaluating only its preserved side PS 106 (as indicated by step 312) because: (1) the LOJ does not generate any duplicates of the rows returned from the PS 106 (since Condition 3 establishes that the NSS 108 returns at most one row for each row returned by the PS 106); and (2) values from the NSS 108 are immaterial (since no expression from the NSS 108 is used outside the left outer join, as established in step 306).

If, instead, Condition 3 is not satisfied, then it is not possible to optimize the evaluation of the LOJ as indicated by step 314.

Example pseudocode algorithms corresponding to the LOJ and ROJ optimization process of embodiments of the invention are presented in FIGS. 5-7. Actual code for implementing these algorithms (shown in FIGS. 3-7) will be apparent to persons skilled in the relevant art(s) based on the teachings contained herein.

4. Alternative Embodiment—Execution Time Optimization

In the example embodiment described above, Conditions 1, 2 and 3 are tested during the pre-optimization phase (i.e., during compile time) by the query optimizer 266. In this section, an exemplary alternative embodiment is described wherein Condition 3 is tested during compile time, and then re-tested during execution time in the event the compile time test was not satisfied.

The cost of computing the result set of an outer join has three components:

A=The cost of computing the PS during execution by the execution unit 269.

B=The cost of computing the NSS by the execution unit 269 (it is possible that the NSS is computed for each row of the PS during execution).

C=The cost of computing the outer join itself by the execution unit 269 (i.e., matching PS and NSS records and concatenating the PS and NSS records).

The embodiment described in the sections above reduced the cost of computing the outer join result set to the cost component "A" when Conditions 1 and 2, or 1 and 3 were satisfied. However, if either Condition 1 was not satisfied, or both Conditions 2 and 3 were not satisfied, then according to the embodiment described in the sections above, the cost of computing the outer join result set was the sum of the cost components "A", "B" and "C".

Figure 9:
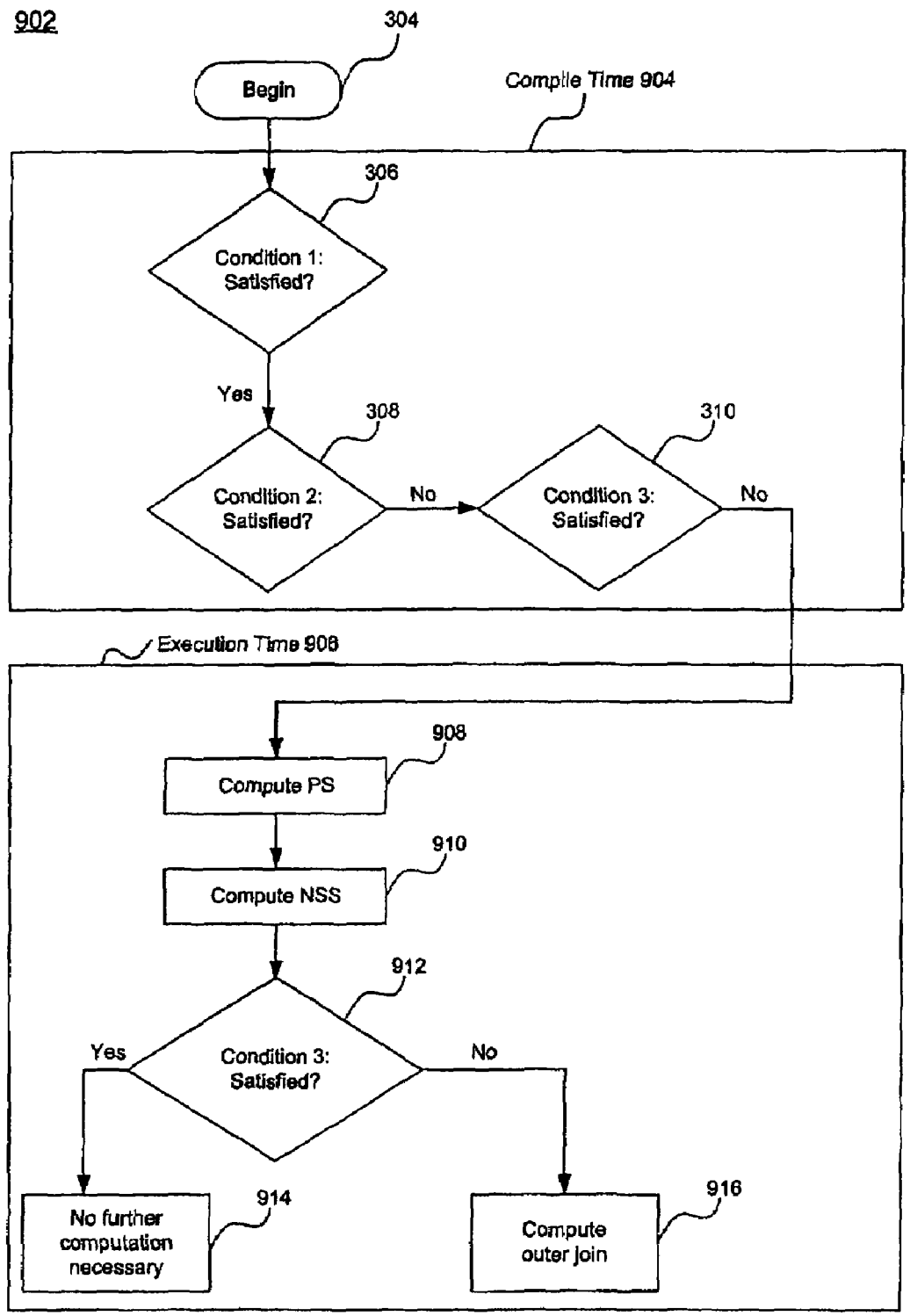
FIG. 9 illustrates an outer join optimization process according to an example alternative embodiment of the invention.

The alternative embodiment described in this section potentially reduces this cost. This alternative embodiment shall be described with reference to flowchart 902 shown in FIG. 9. In steps 306, 308 and 310 (similar to those in FIG. 3), Conditions 1, 2 and 3 are tested. This occurs at compile time 904. FIG. 9 shows the particular scenario where, during this test at compile time 904, it is determined that Condition 1 is satisfied, but neither Condition 2 nor Condition 3 is satisfied.

In the embodiment of FIG. 9, in step 908, the PS is computed by execution unit 269 during execution time. In step 910, the NSS is also computed by execution unit 269 during execution time. At that point, in step 912, Condition 3 is re-tested by execution unit 269. In particular, execution unit 269 determines whether the NSS result set computed in step 910 contains at most one row for each PS row.

If the NSS result set contains more than one row, then Condition 3 is not satisfied, and the outer join is computed in step 916. In this case, the cost of computing the outer join is the sum of the cost components "A", "B" and "C".

If, instead, the NSS result set does contain at most one row, then Condition 3 is satisfied, and no further computation is required (as indicated by step 914). In other words, the result set of the outer join is equal to the result set of the PS that was computed in step 908. Accordingly, the cost of computing the outer join is reduced to the cost components "A" (step 908) and "B" (step 910). Cost "C" is not incurred because it is not necessary to perform the outer join itself.

An example of such a case shall now be described. Consider the following query:

select P.*
    from P LEFT OUTER JOIN N ON (N.x>100 and N.y=P.y)

If during execution, the computed result set of the NSS expression "select N.y from N where N.x>100" is exactly 1 row, then Condition 3 is TRUE for any row of the preserved side P. In this case, the result set of the outer join is the result set of the PS. The cost of computing the result set of the OUTER JOIN is reduced to computing once the result set of the expression "select N.y from N where N.x>100", and computing once the result set of the P.

5. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method of processing a left or right outer join in a database management system, wherein said left or right outer join is an expression that references a preserved side and a null supplying side, comprising:

determining whether an expression from said null supplying side is used outside of said left or right outer join;

determining whether said left or right outer join is expected to return only distinct values from said preserved side, when an expression from said null supplying side is not used outside of said left or right outer join; and optimizing evaluation of said left or right outer join, using a processor, to evaluation of an expression referencing said preserved side and not said null supplying side, when said left or right outer join is expected to return only distinct values from said preserved side.

2. The method of claim 1, wherein said step of determining whether said left or right outer join is expected to return only distinct values from said preserved side comprises:

determining whether said left or right outer join is contained in a query block which explicitly uses an "select distinct" construct; and determining whether said left or right outer join is contained in a query block which implicitly is required to return distinct values.

3. The method of claim 1, further comprising:

determining whether said null supplying side returns at most one row for each row returned by said preserved side, when said left or right outer join is not expected to return only distinct values from said preserved side; and optimizing evaluation of said left or right outer join to evaluation of an expression referencing said preserved side and not said null supplying side, when said null supplying side returns at most one row for each row returned by said preserved side.

4. The method of claim 3, wherein said step of determining whether said null supplying side returns at most one row for each row returned by said preserved side comprises:

reviewing a table definition of each derived table of said null supplying side to determine whether said derived table returns at most one row; and when review of said table definition does not indicate that said derived table returns at most one row, then determining all columns of said derived table which are equated to single values, and determining whether there exists a candidate key whose columns are among those equated with single values.

5. The method of claim 4, wherein said step of determining whether said null supplying side returns at most one row for each row returned by said preserved side further comprises:

for each base table of said null supplying side, determining all columns of said each base table which are equated to single values, and determining whether there exists a candidate key whose columns are among those equated with single values.

6. The method of claim 3, wherein said steps of determining whether an expression from said null supplying side is used outside of said left or right outer join, determining whether said left or right outer join is expected to return only distinct values from said preserved side, and determining whether said null supplying side returns at most one row for each row returned by said preserved side are performed at compile time, the method further comprising:

re-testing at execution time whether said null supplying side returns at most one row for each row returned by said preserved side when at compile time (a) an expression from said null supplying side is not used outside of said left or right outer join; (b) said left or right outer join is not expected to return only distinct values from said preserved side; and (c) said null supplying side does not return at most one row for each row returned by said preserved side; and adopting as a result set of said left or right outer join a result set of said preserved side, when at execution time said null supplying side returns at most one row for each row returned by said preserved side.

7. A method of processing a left or right outer join in a database management system, wherein said left or right outer join is an expression that references a preserved side and a null supplying side, comprising:

determining whether Condition 1 is true;

when Condition 1 is true, then determining whether either Condition 2 or Condition 3 is true; and when Condition 1 is true, and either Condition 2 or Condition 3 is true, then evaluating said left or right outer join, using a processor, by evaluating an expression referencing said preserved side and not said null supplying side;

where Conditions 1, 2 and 3 are defined as follows:

Condition 1: an expression from said null supplying side is not used outside of said left or right outer join;

Condition 2: said left or right outer join is expected to return only distinct values from said preserved side;

Condition 3: said null supplying side returns at most one row for each row returned by said preserved side.

8. The method of claim 7, further comprising:

determining whether Condition 2 is true by determining whether said left or right outer join is contained in a query block which has an explicit "select distinct" clause; and determining whether Condition 2 is true by determining whether said left or right outer join is contained in a query block which is implicitly required to return distinct values.

9. The method of claim 7, further comprising:

determining whether Condition 3 is true by (a) reviewing a table definition of each derived table of said null supplying side to determine whether said derived table returns at most one row; and (b) determining whether there exists a candidate key whose columns are equated with single values, when review of said table definition does not indicate that said derived table returns at most one row.

10. The method of claim 9, wherein said step of determining whether Condition 3 is true further comprises:

for each base table of said null supplying side, determining whether there exists a candidate key whose columns are equated with single values.

11. The method of claim 7, wherein Conditions 1, 2, and 3 are tested at compile time, the method further comprising:

re-testing Condition 3 at execution time, when at compile time Condition 1 is satisfied, but Conditions 2 and 3 are not satisfied; and adopting as a result set of said left or right outer join a result set of said preserved side, when at execution time Condition 3 is satisfied.

12. A computer program product comprising a tangible computer useable medium having computer program logic stored thereon for enabling a processor to process a left or right outer join, wherein said left or right outer join is an expression that references a preserved side and a null supplying side, said computer program logic comprising:

first means for enabling said processor to determine whether Condition 1 is true;

second means for enabling said processor to determine whether either Condition 2 or Condition 3 is true, when Condition 1 is true; and third means for enabling said processor to evaluate said left or right outer join by evaluating an expression referencing said preserved side and not said null supplying side, when Condition 1 is true, and either Condition 2 or Condition 3 is true;

where Conditions 1, 2 and 3 are defined as follows:

Condition 1: an expression from said null supplying side is not used outside of said left or right outer join;

Condition 2: said left or right outer join is expected to return only distinct values from said preserved side;

Condition 3: said null supplying side returns at most one row for each row returned by said preserved side.

13. The computer program product of claim 12, wherein said second means comprises:

means for enabling said processor to determine whether Condition 2 is true by determining whether said left or right outer join is contained in a query block which has an explicit "select distinct" clause; and means for enabling said processor to determine whether Condition 2 is true by determining whether said left or right outer join is contained in a query block which is implicitly required to return distinct values.

14. The computer program product of claim 12, wherein said second means comprises:

fourth means for enabling said processor to determine whether Condition 3 is true by (a) reviewing a table definition of each derived table of said null supplying side to determine whether said derived table returns at most one row; and (b) when review of said table definition does not indicate that said derived table returns at most one row, then determining columns of said derived table which are equated to single values, and determining whether candidate key columns are among columns equated with single values.

15. The computer program product of claim 14, wherein said fourth means further comprises:

means for enabling said processor to, for each base table of said null supplying side, determine columns of said base table which are equated to single values, and determine whether candidate key columns are among columns equated with single values.

16. The computer program product of claim 12, wherein Conditions 1, 2, and 3 are tested at compile time, said computer program logic further comprising:

means for enabling said processor to, when determined at compile time that Condition 1 is satisfied, but Conditions 2 and 3 are not satisfied, re-test Condition 3 at execution time, and adopt as a result set of said left or right outer join a result set of said preserved side if it is determined at execution time that Condition 3 is satisfied.

* * * * *